Aug. 17, 1943.    F. M. KINCAID, JR    2,326,866
CLAMP JOINT
Filed Jan. 31, 1941

INVENTOR
Frank M. Kincaid, Jr.
BY
ATTORNEY

Patented Aug. 17, 1943

2,326,866

UNITED STATES PATENT OFFICE 2,326,866

CLAMP JOINT

Frank M. Kincaid, Jr., Mountain Lakes, N. J., assignor to Wright Aeronautical Corporation, a corporation of New York Application January 31, 1941, Serial No. 376,742

6 Claims. (Cl. 287—124)

This invention relates to joints and particularly to joints wherein a shaft is fitted to an embracing member and wherein the shaft and member are secured to one another against relative displacement. A particular environment in which the provisions of the invention may be useful is in the clamp joint between a crankpin and crankcheek in a composite engine crankshaft, particularly in single or double throw crankshafts of radial cylinder aircraft engines. Such shafts, according to conventional practice, are built up of a crankcheek and a crankpin secured to one another either by splined connection or by clamping the cheek around the crankpin by means of a clamp bolt in the cheek. The present invention contemplates expanding the crankpin, which is hollow, outwardly into clamping engagement with the crankcheek.

Further objects of the invention, in addition to that just noted, consist in the provision of means for expanding a sleeve into clamping engagement with an embracing member; to provide means for expanding a hollow member under stress intensities within the elastic limit of the material, into clamping engagement with an embracing member; to provide expanding means consisting of nested cupped elements within a hollow sleeve which may be deformed for increase in their diameter by the application of axial pressure to the cupped elements, such increase in diameter concurrently enforcing radially outward expansion of the sleeve element.

A further object is to provide improvements in crankpin construction, including the provision of reinforcing means tending to hold a hollow crankpin in circular form.

Further objects of the invention will become apparent in reading the description below in connection with the drawing, in which.

Figure 1:
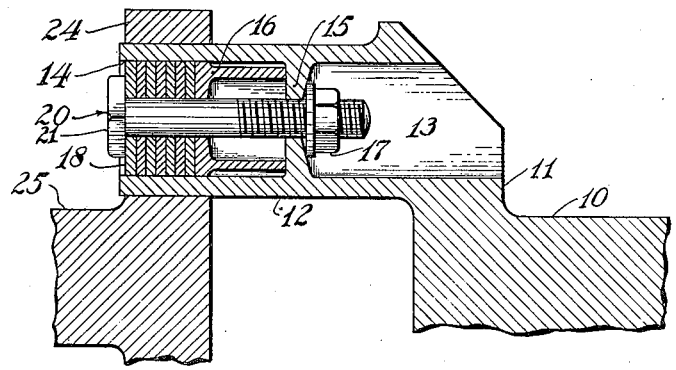
Fig. 1 is a longitudinal section through a crankpin-crankcheek joint.
Figure 2:
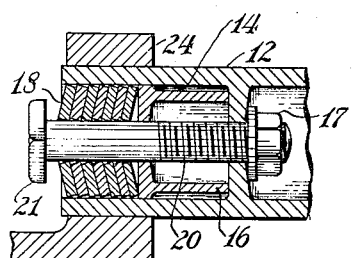
Fig. 2 is a fragmentary longitudinal section of the joint of Fig. 1 prior to clamping.

Referring first to Figs. 1 and 2, 10 indicates a crankshaft journal having an integral crankcheek 11 from which an integral crankpin 12 extends in parallelism with the journal 10. The pin 12 is hollow as at 13 for lightness and is hollow at its free end as at 14 for a purpose shortly to be described, the hollows 13 and 14 being separated by an annular partition 15 midway of the crankpin journal to provide for reinforcement to assure circular form of the journal under stress, the partition 15 also forming an abutment for a spacer 16 and for a nut 17. The spacer 16 is disposed within the hollow 14 and stacked at the left end of the spacer and within the hollow 14 are a plurality of cupped washers 18 whose concave sides face toward the spacer 16. These washers are chamfered at their edges as shown in either Figs. 5 or 6 and are formed with an outside diameter such that they fit closely to the bore 14 when in the unstressed condition. A bolt 20 is passed through the stack of washers 18, through the spacer 16 and through the abutment 15, and is engaged by the nut 17. Upon tightening of the nut 17, the head 21 of the bolt engages the left end washer 18 adjacent the edge of the washer hole, and the whole stack of washers is gradually flattened by the application of axial force from their cupped form to a substantially plane form, as shown in Fig. 1. As axial pressure is applied to the stack of washers, and as they approach a plane attitude, they naturally become larger in overall diameter and thus bind upon the inner wall of the crankpin 14 and as their diameter further increases, the crankpin wall is expanded radially into firm clamping engagement with a crankcheek member 24 embracing the left end of the crankpin 12, the crankpin being closely fitted initially to the bore in the crankcheek. Said crankcheek carries a crankshaft journal 25 coaxial with the journal 10. It is deemed to be within the abilities of one skilled in the art to calculate the clearances necessary for assembly of the several components in order to attain a finite clamping effect between the crankpin 12 and the crankcheek 24. Obviously, the thickness of the crankpin wall in addition to the size and degree of cupping of the washers 18 will be important factors in determining the tightness of the final joint. It is considered that the stresses imposed by flattening the cupped washers should be within the elastic limit of the materials of both the washers, the crankpin, and the crankcheek in order that disassembly may be effected when desired and in order that the strength of the several components will not be diminished.

It is apparent that the stack of washers 18 attains a thickness substantially the same as the thickness of the cheek 24 in order that full clamping action may be attained throughout the thickness of the crankcheek and without expanding the crankpin at those portions in its length where clamping action is unnecessary.

Figure 3:
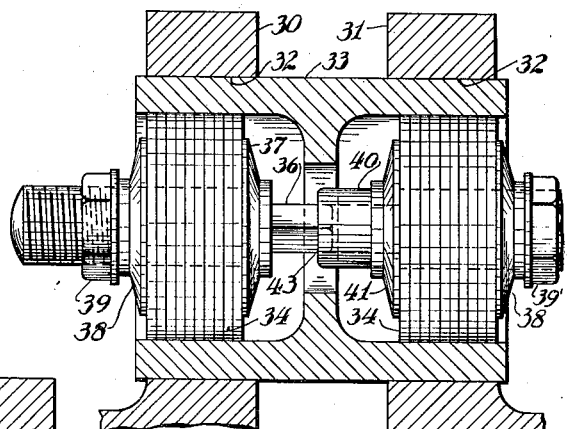
Fig. 3 is a longitudinal section through an alternate form of joint.
Figure 4:
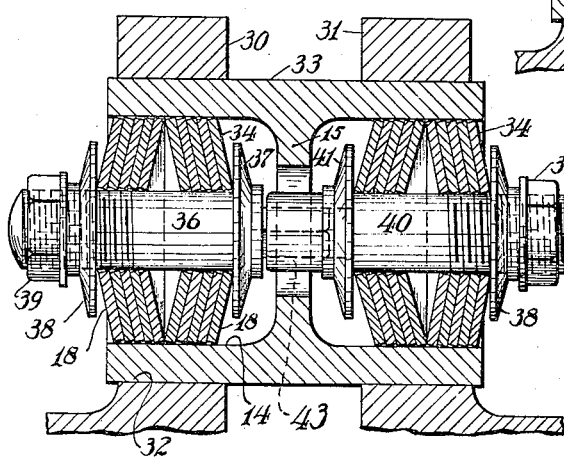
Fig. 4 is a longitudinal section of the joint of Fig. 3 before clamping.

Figs. 3 and 4 show an alternate type of joint wherein two spaced crankcheeks 30 and 31 are provided with alined bores 32 engaged by a hollow crankpin 33. Two stacks of washers 34 are utilized, one for enforcing clamping engagement of the crankpin 33 with the cheek 30, and the other for enforcing clamping engagement of the crankpin 33 with the cheek 31. Each stack comprises a first plurality of washers 18 whose concave faces are opposite a second plurality of washers whose concave faces in turn face toward the first plurality. The tightening bolt for this arrangement consists of a shank 36 having an integral abutment 37 engaging the inner edge of the convex side of one washer, there being another abutment washer 38 engaging the convex side of the washer at the other end of the set. The abutments 37 and 38 are brought together by the means of a nut 39 whereupon the washers 18 are flattened and effect clamping between the crankpin and crankcheek as above described. The other set of cupped washers are clamped in similar manner by a bolt 40 having an inner integral abutment 41 engaging the end washer of the other set of washers. Between the abutments 37 and 41, the bolts 36 and 40 are sleeved, one over the other, as at 43, this sleeving connection allowing of free axial movement of the bolts 36 and 40 and preventing relative rotation therebetween. Thus, when nuts 39 and 39' are concurrently tightened, the two washer sets 34 will be drawn up axially without displacing their edges from the proper axial relationship with respect to the crankcheeks 30 and 31 with which respective sets are substantially coplanar.

Figures 5, 6:
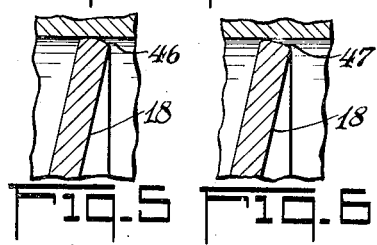
Figs. 5 and 6 are enlarged detailed sections showing alternate modes of forming certain elements of the joint.

As mentioned previously, the washers 18 are chamfered slightly at their outer edges, either in a spherical form as shown at 46 in Fig. 5, or with small radii at the washer edges as shown at 47 in Fig. 6. By this breaking of the edges a good initial fit may be assured between the washer and the crankpin bore and additionally, as the washer is flattened, its edge will not tend to scuff the surface of the crankpin.

Although the invention has been shown as applied to a crankpin to crankcheek joint, it is obvious that the teachings of the invention may be applied at any joint between a hollow member and an embracing member, and it is intended that the claims below cover any such alternate arrangement or environment for the invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a clamp joint between a member having a bore and a hollow shaft fitted to the bore for free assembly with the member, a plurality of dished chamfered edge annular washers disposed in the hollow shaft, a reaction means within the shaft engaging the outer edge of one of the end washers of the plurality on its concave face to properly position the washers within said shaft, and a member passing through the holes of the washers engaging said reaction means and engaging the hole edge of the other end washer of a plurality on its convex face, said member being axially movable toward said reaction means to flatten said washers.

2. In a clamp joint between a hollow shaft and a pair of spaced members having alined bores, said shaft being fitted to said bores and bridging said members, a set of cupped washers within the hollow shaft in the plane of each member, and means to uncup or flatten said washer sets jointly for peripheral binding engagement with the shaft and thereby to expand the shaft ends into binding engagement with said members, said uncupping means comprising end-to-end elements relatively axially movable and constrained against relative rotation, and screw devices engaging the outer ends of said elements for clamping the washers of each set.

3. In a clamp joint between a hollow shaft and a pair of spaced members having alined bores, said shaft being fitted to said bores and bridging said members, a set of cupped washers within the hollow shaft in the plane of each member, and means to uncup or flatten said washer sets jointly for peripheral binding engagement with the shaft and thereby to expand the shaft ends into binding engagement with said members, said uncupping means comprising end-to-end elements relatively axially movable and constrained against relative rotation, and screw devices engaging the outer ends of said elements for clamping the washers of each set, said pin having a central internal annular rib between said members to stiffen the shaft.

4. In a clamp joint between a hollow shaft and a pair of spaced members having alined bores, said shaft being fitted to said bores and bridging said members, a set of cupped washers within the hollow shaft in the plane of each member, and means to uncup or flatten said washers, said means comprising a pair of members each extending through one of said sets of washers, said members being relatively axially movable but constrained against relative rotation.

5. In a clamp joint between a hollow element and a member having a bore within which said element is fitted, a stack of initially dished-shaped washers fitted within said hollow element, annular rib means rigidly disposed within said hollow element and cooperable with the periphery of the concave end of the stack of dished-shaped washers for properly locating said washers within said element, an axially movable screw means extending through the washers and cooperating with said annular rib means for drawing the central portion of said washers toward said rib means to flatten said washers and to enforce movement of the peripheries of said washers radially outward into binding engagement with the hollow element, said element being radially extended by washer pressure into binding engagement with said member.

6. In a clamp joint between a hollow element and a member having a bore within which said element is fitted, a stack of initially dished-shaped washers fitted within said hollow element, stop means disposed within said hollow element and cooperable with the periphery of the concave end of the stack of dished-shaped washers to properly locate said washers within said element, a movable member extending through the washers and cooperating with said stop means for drawing the central portions of said washers toward said stop means to flatten said washers and to enforce movement of the peripheries of said washers radially outward into binding engagement with the hollow element, said element being radially extended by washer pressure into binding engagement with said member.

FRANK M. KINCAID, Jr.